3,836,501
SELF-EXTINGUISHING POLYAMIDE
MOULDING COMPOSITIONS
Peter Tacke and Heinrich Haupt, Krefeld, Heinz Ulrich Blank, Cologne, and August Böckmann and Hans Rudolph, Krefeld, Germany, assignors to Bayer Aktiengesellschaft, Leverkusen, Germany
No Drawing. Filed Jan. 26, 1973, Ser. No. 327,110
Claims priority, application Germany, Jan. 27, 1972, P 22 03 704.3; Mar. 22, 1972, P 22 13 801.8
Int. Cl. C08g 51/04
U.S. Cl. 260—37 N   4 Claims

ABSTRACT OF THE DISCLOSURE

Permanently self-extinguishing polyamide moulding compositions containing from 6 to 30% by weight of an oligomeric or polymeric halogen-containing compound which has a halogen content of from 10 to 80% by weight.

---

This invention relates to permanently self-extinguishing non-dripping polyamide moulding compositions which contain oligomeric and/or polymeric halogen compounds, and to a process for the production of such moulding compositions.

It is known that polyamides can be rendered flameproof by the addition of halogen compounds and, optionally, metal oxides. One disadvantage of this combination is that the polyamides lose their non-inflammability if they are exposed to prolonged stressing at elevated temperatures of around 100° C. When such articles are exposed to flames, the flames spread on the surfaces and extinguish only after several minutes unless the article is completely burnt, as has been observed on several occasions.

In addition, most of the halogen compounds used, such as high-grade halogenated aromatic compounds, also have the disadvantage of being highly toxic. They are not broken down by living organisms but are instead retained within fatty tissue. They can enter the body not only on contact with the skin, but also from air inhaled into the lungs. Accordingly, extrusion and injection-moulding of such flameproofed polyamide moulding compositions involve a danger of poisoning arising from the volatility of the halogen compound used. In addition, the incorporation of these compounds adversely effects the mechanical properties of the chemical materials by promoting embrittlement.

Surprisingly, it has now been found that the disadvantages referred to above can be obviated by using as flameproofing agents polymeric or at least oligomeric halogen-containing compounds which have a halogen content of from 10 to 80% by weight.

Polyamides flameproofed in this way do not undergo any reduction in non-inflammability of exposure to prolonged stressing at elevated temperature; there is no danger of poisoning; and even where oligomeric halogen compounds are used the deterioration found in mechanical properties is extremely limited. In addition, it was found totally unexpectedly that less halogen is required to obtain a certain standard degree of flame proofing where a halogen compound of relatively high molecular weight is used, than where a compound of low molecular weight is used.

Accordingly the present invention relates to permanently self-extinguishing polyamide moulding compositions containing from 6 to 30% by weight of an oligomeric or polymeric halogen-containing compound which has a halogen content of from 10 to 80% by weight, from 0 to 25% by weight of at least one synergistically active metal compound and from 0 to 50% by weight of fillers.

The flameproofing effect is synergistically increased by the addition of a number of metal oxides, such as the oxides of antimony, iron, zinc or lead. The oxides used may be added either separately or as a mixture with one another. Where a mixture of oxides is added, particularly outstanding flameproof properties is frequently obtained, for example when a mixture of zinc oxide and iron oxide is used. The quantitative ratio of the two oxides in the oxide-mixture is of negligible importance. For example a mixture containing 75% by weight of zinc oxide and 25% by weight of iron oxide have almost the same effect as a mixture having the inverse quantitative ratio $Fe_2O_3$ or $Fe_3O_4$ or mixtures thereof may be used as the iron oxide.

These synergistically active materials may be added in quantities of from 0 to 25% by weight, preferably from 2 to 10% by weight. Instead of oxides, it is also possible to use the corresponding metal salts of weak acids such as carbonates, acetates or borates.

Mixtures of a metal oxide, such as zinc oxide or iron oxide and a salt of a metal in Group 1a, 2a or 2b of the Periodic Table of Elements (Handbook of Cheimistry and Physics, 47th Edition (1966), page B–3, Chemical Rubber Company, Cleveland, Ohio) with a weak acid selected from the group consisting of oxygen acid of an element in Group 3a, 4a or 5a of the Periodic Table of Elements and $H_2S$ also show synergistic activity when incorporated into polyamides together with the halogen compounds which may be used according to the invention. The following may be mentioned as examples of salts of metals of the aforementioned Groups of the Periodic System with weak acids: carbonates, formates, acetates, oxalates, borates, sulphides, silicates, stannites, stannates, plumbates or antimonates of sodium, potassium, magnesium, calcium, barium or zinc. The metal oxide and the aforementioned salts may be present in the mixtures in a ratio by weight of from 10:1 to 1:1, preferably from 5:1 to 2:1. These mixtures may be added in quantities of from 0 to 25% by weight, preferably from 1 to 15% by weight.

Halogen compounds suitable for use according to the invention include any oligomeric and polymeric substances which will withstand incorporation into a polyamide moulding composition at temperatures around 300° C. without decomposing, having relative viscosities of from 1 to 6 and a halogen content of from 10 to 80% by weight.

Examples of such compounds include polymethacrylic acid ester which alcohol component is an Die's-Alder adduct of a polyhalogenated cyclopentadiene with an olefin, such as an adduct of hexachlorocyclopentadiene with allyl alcohol; polycarbonates of a halogenated bis-(hydroxyphenyl)-alkane, such as 4,4'-dihydroxy-3,5,3',5'-tetrachlorodiphenylpropane - 2,2,4,4' - dihydroxy-3,5,3',5'-tetrachlorodiphenylsulfone, tetrabroms- or tetrachlorohydrochinone with a derivative of carbonic acid, such as carbonic acid diester or -dihalogenide; polyethers of halogenated dihydroxydiphenyl or dihydroxydiphenyl ether or polyethers obtained from low molecular weight, aromatic, high-grade halogenated substances when these are reacted with alkali and/or alkaline-earth hydroxides, such as polycondensates of octachloro-4,4'-dihydroxydiphenyl, chlorinated polyphenylene oxide, polyesters of the above-mentioned dihydroxy compounds with tetrachloroterephthalic acid, isophthalic acid, terephthalic acid, halogenated polyamides such as polyamides of tetrachloroterephthalic acid, isophthalic acid, terephthalic acid, halogenated polyamides such as polyamides of tetrachloroterephthalic acid and halogenated or unhalogenated 4,4'-diaminodiphenylether or toluylene diamine and polycondensation products of chloranil and ammonia. Polymers and oligomers which are obtained by heating highly halogenated aromatic compounds with Friedel-Crafts catalysts and which are dark-coloured resins, have also proved to be suitable such as chlorinated polyphenyls. Halogenated polysulfides, sulfons such as polychlorinated polyphenylsulfide, polyphenylsulfone, are also suitable compounds.

Polyamides which can be flameproofed in accordance with the invention include the type generally described in U.S. Patent Specifications Nos. 2,071,250; 2,071,253; 2,130,948; and 3,015,652, for example the homopolyamides which are obtained by the polymerisation of amino acids and/or their lactams, such as ε-amino caproic acid, 11-amino undecanoic acid, 4,4-dimethyl acetidinone, β-pyrrolidone, ε-caprolactam, oenanthic lactam, caprylic lactam or lauric lactam. Polyamides of the kind obtained by polycondensing a diamine, such as ethylene diamine, hexamethylene diamine, decamethylene diamine, dodecamethylene diamine, 2,2,4- or 2,4,4-trimethylene hexamethylene diamine, p- or m-xylylene diamine, bis-(4-amino cyclohexyl)-methane, 3-amino methyl-3,5,5-trimethyl cyclohexyl amine or 1,4-diaminomethyl cyclohexane, with a dicarboxylic acid such as sebacic acid, heptadecanodicarboxylic acid, 2,2.4- or 2,4,4-trimethyl adipic acid, isophthalic acid or terephthalic acid, can also be flameproofed with the combination of materials proposed according to the invention, as can copolyamides of the kind obtained by polymerising or polycondensing several of the aforementioned compounds.

In addition to the flameproofing agents, the polyamide moulding compositions may also contain additives such as pigments, dyes, light and heat stabilisers, optical brighteners, plasticisers, chain terminators, lubricants mould-release agents, and may further contain from 0 to 50%, preferably from 1 to 50% by weight of fillers and/or strengtheners such as kaolin, glass or asbestos fibres, talcum, chalk, quartz powder or crushed rock.

The moulding compositions which have been rendered flameproof according to the invention and which optionally contain further synergistic additives, at least comply in inflammability with Group SE I, Underwriters' Laboratories (UL), Subject 94; i.e. test specimens prepared from moulding compositions treated according to the invention extinguish at the latest 25 seconds after the standard Bunsen flame is removed and do not drip; have better mechanical properties than moulding compositions treated with conventional flameproofing agents and require smaller quantities of flameproofing agent to obtain a given degree of flameproofing.

The invention also relates to a process for the production of permanently self-extinguishing polyamide moulding compositions, optionally containing fillers, in which a polymeric or oligomeric halogen-containing compound is incorporated into the polyamide moulding compositions in an extruder. Fillers may optionally be incorporated into the moulding compositions together with the flameproofing additives.

The aforementioned polyamide moulding compositions are eminently suitable for the production of flameproof injection mouldings.

EXAMPLE 1

1.5 kg. of a polycaprolactam of relative viscosity 3.13 (as measured in a solution of 1 g. of polyamide in 99 g. of m-cresol at 25° C.) reinforced with 30% by weight of glass fibres (average length approximately 250μ) were mixed with 180 g. of granulated polycarbonate of 4,4'-dihydroxy-3,5,3',5'-tetrabromodiphenylpropane - 2,2 and phosgene (relative viscosity 1.08, measured in a 0.5% by weight solution of the polycarbonate in methylene chloride at 25° C.), 90 g. of very finely powdered ZnO and 30 g. of very finely powdered black iron oxide ($Fe_2O_3/Fe_3O_4$) in a single shaft extruder at a temperature of approximately 270° C. Strands were drawn off and granulated. The granulate was dried and injection-moulded to form test bars measuring 1.6 x 12.7 x 128 and 6.4 x 12.7 x 128 mm. In a burning test carried out according to Subject 94 of the Underwriters' Laboratories (UL) Specification the vertically oriented test bars were exposed to a standard Bunsen flame for 10 seconds continued to burn for an average of 3.7 seconds, but at most for 7 seconds and did not drip. Accordingly, the material complied with Group SE O.

The impact strength of the freshly injected material, as measured of standard small bars according to DIN 53,453, was 35.6 kp.cm./cm.$^2$. The value for the polyamide which had not been flameproofed according to the invention was 50 kp.cm./cm.$^2$.

EXAMPLE 2

(Comparison with Example 1)

121 g. of decabromodiphenyl ether, was worked into the mixture described in Example 1 instead of 180 g. of brominated polycarbonate (giving the same bromine content) and the mixture treated as described in that Example. In the burning test, the test bars continued to burn for an average of 12.4 seconds but at most for 32.1 seconds. Accordingly, this material complied with Group SE I (Subject 94 of Underwriters' Laboratories (UL) Specification). The product had an impact strength of 23.8 kp.cm./cm.$^2$.

160 g. of decabromodiphenyl ether were required to obtain a degree of flameproofing corresponding to Group SE O. In this case, the small standard bars had an impact strength of 19.7 kp.cm./cm.$^2$.

305 g. of the test bars, measuring 1.6 x 12.7 x 128 mm. were stored in a drying cabinet at 100° C. for 140 days. When tested for inflammability, 7 of these test bars were completely burnt and 3 bars were extinguished after 51, 79 and 83, seconds respectively.

In a comparison test the bars prepared as described in Example 1 did not show any change in flammability.

EXAMPLE 3

(Comparison to Example 4)

A mixture of 150 g. of decachlorodiphenyl, 90 g. of iron oxide ($Fe_2O_3/Fe_3O_4$ mixture) and 30 g. of ZnO was incorporated into 1.5 kg. of glass-fibre-reinforced polycaprolactam (as described in Example 1) in a single-shaft extruder at a temperature of approximately 250° C. On emerging from the extrusion die, the plastic mass generated distinctly more vapours than comparison mixtures prepared without decachlorodiphenyl. Test bars with the dimensions specified in Example 1 were again injection-moulded from the granulate of the decachlorodiphenyl containing product. Some of the decachlorodiphenyl evaporated during incorporation of the flameproofing additives and processing in the injection-moulding machine. This was apparent from the chlorine content of the test bars which was 5.52% whereas that calculated on the basis the quantity of chlorine compound used is 5.93%. The bars again showed flammability consistent with Group SE I, UL, Subject 94 (they continued to burn for an average of 16 seconds). The material had an impact strength of 22.7 kp.cm./cm.$^2$, as measured according to DIN 53,453.

It was not possible to improve the degree of flame-proofing to that required by SE O by increasing the content of the halogen-containing compound because the end product in these attempts crumbled.

In order to accelerate diffusion of the low molecular weight halogen-containing compounds to the surface of the polyamide moulding, 10 test bars 1.6 mm. thick were stored in a vacuum drying cabinet at 100° C./1 Torr for 3 weeks. 8 of the 10 bars subsequently failed the burning test: They were completely burnt. 2 bars were extinguished after 53 and 89 seconds, respectively. The flame spread approximately two thirds of the length of the bars along the surface.

EXAMPLE 4

183 g. of a resin (chlorine content 57.4%) having a relative viscosity of 2.83 (as measured in a solution of 1 g. of resin in 99 g. of m-cresol at 25° C.) which had been prepared by heating decachlorodiphenyl and an incompletely chlorinated naphthyline (m.p. approx. 126° C.) with $AlCl_3$, with accompanied elimination of HCl, were used instead of the 150 g. of decachlorodiphenyl as described in Example 3. Test bars of this material satisfied the requirements of UL, Subject 94, and complied with Group SE I (they continued burning for an average of 12.7 seconds). Even when heated in a drying cabinet under a vacuum of 1 Torr, the product did not undergo any appreciable reduction in non-inflammability. It had an impact strength of 32.6 kp.cm./cm.$^2$, as measured according to the appropriate DIN Specification.

EXAMPLE 5

A dark brown, powdered, infusible and almost non-inflammable substance containing 53.8% of chlorine was obtained by heating chloranil for 5 hours with an excess of aqueous ammonia in an autoclave at 120° C.

200 g. of this substance and 120 g. of iron oxide (mixture of $Fe_2O_3$ and $Fe_3O_4$) were mixed and incorporated into 1.5 kg. of 6,6-polyamide (relative viscosity 3.41, as measured in a solution of 1 g. of polyamide in 99 g. of m-cresol at 25° C.) reinforced with 30% by weight of glass fibres (average length approximately 250$\mu$) in a single-shaft extruder at a temperature of approximately 260° C. After it had been injection-moulded into test bars, the product again complied in flammability with Group SE I, UL Subject 94 (burning for an average of 11.8 seconds). It had an impact strength of 31.8 kp.cm./cm.$^2$.

The flameproof properties of the standard test bars were unaffected after heating at 100° C. in a drying cabinet for a period of 140 days.

EXAMPLE 6

(Comparison to Example 5)

200 g. of decachlorodiphenyl were used, instead of the high molecular weight halogen-containing compound as described in Example 5. In the burning test, the test bars continued to burn for an average of 14.3 seconds. They had an impact strength of 25.8 kp.cm./cm.$^2$.

After the test bars had been heated for 140 days as described in Example 5, 9 out of 10 bars were completely burnt, whereas 1 test bar was extinguished after 63 seconds

EXAMPLE 7

1.5 kg. of 11-polyamide (relative viscosity 2.73) reinforced with 30% by weight of glass fibres (average length approximately 250$\mu$) were homogenised in a single-shaft extruder at approximately 250° C. with 300 g. of a granulated polycarbonate of 4,4'-dihydroxy-3,5,3',5'-tetrachlorodiphenylpropane-2,2 and phosgene (relative viscosity 1.08, measured in a 0.5% by weight solution of polycarbonate in methylene chloride at 25° C.), 90 g. of iron oxide (mixture of $Fe_2O_3$ and $Fe_3O_4$) and 40 g. of $Sb_2O_3$. Test bars produced from the mixture described as in Example 1 continued to burn for an average of 17.3 seconds when tested according to the Underwriters' Laboratories Specification and, hence again complied with Group SE I. Their impact strength was 33.7 kp.cm./cm.$^2$.

There was no sign of any reduction in the flameproof properties after heating in vacuo at 100° C. for 3 weeks.

EXAMPLE 8

(Comparison to Example 7)

200 g. of decachlorodiphenyl were used instead of the high molecular weight halogen-containing compound as described in Example 7.

The test bars continued to burn for an average of 16.4 seconds. They had an impact strength of 24.3 kp.cm./cm.$^2$. After heating at 100° C. in a vacuum drying cabinet for 3 weeks, 8 of 10 bars were completely burnt, whereas 2 were extinguished after 60 and 64 seconds, respectively.

EXAMPLE 9

180 g. of a polycarbonate of 4,4'-dihydroxy-3,5,3',5'-tetrabromodiphenylpropane-2,2 and phosgene (relative viscosity 1.08 measured in a 0.5% by weight solution of polycarbonate in methylene chloride at 25° C.), 90 g. of ZnO, 30 g. of very finely powdered chalk and 30 g. of $TiO_2$ pigment (rutile) were incorporated into 1.5 kg. of 6-polyamide reinforced with 30% by weight of glass fibres (as in Example 1). An almost white injection-moulding composition was obtained. Test bars prepared from this composition showed outstanding flameproof properties (Group SE I, UL) with average burning times of 7.3 seconds. Their impact strength was 28.7 kp.cm./cm.$^2$. There was no reduction in the flameproof properties after heating at 100° C. in a drying cabinet for 140 days.

EXAMPLE 10

(Comparison to Example 9)

When 121 g. of decabromodiphenyl ether were used instead of the polymeric, halogen-containing compound as described in Example 9, the test bars continued to burn for an average of 13.2 seconds, corresponding in flammability to Group SE I, UL. They had an impact strength of 22.7 kp.cm./cm.$^2$.

After heating in a drying cabinet for 140 days, 9 out of 10 bars were completely burnt, whilst 1 was extinguished after 58 seconds.

EXAMPLE 11

200 g. of a polymethacrylic acid ester (the alcoholic component consisting of an adduct of hexachlorocyclopentadiene with an allyl alcohol; relative viscosity 3.5 as measured in a solution of 1 g. of polymethacrylic acid ester in 99 g. of m-cresol at 25° C.), 100 g. of iron oxide ($Fe_2O_3/Fe_3O_4$ mixture) and 40 g. of very finely powdered ZnO were incorporated as flameproofing agents into 1.5 kg. of a 6-polyamide (relative viscosity 3.13 in a single-shaft extruder at a temperature of approximately 235° C.). Test bars injection-moulded from this composition showed outstanding flameproof properties. They were extinguished in an average of 19.5 seconds after removal of the flame, but continued to burn for at most 25 seconds and did not drip, thus complying with Group SE I, Underwriters' Laboratories. Their impact strength was 32.5 kp.cm./cm.$^2$.

Heating in a drying cabinet for 140 days did not produce any change in their flameproof properties.

What is claimed is:

1. A permanently self-extinguishing polyamide moulding composition containing as flame retardant: (a) from 6 to 30% by weight of an oligomeric or polymeric halogen-containing compound which has a halogen content of from 10 to 80% by weight and a relative viscosity of from 1 to 6; and (b) as additional flame retardant, from 1 to 15% by weight of a mixture of at least one member selected from the group consisting of zinc oxide, iron oxide, lead oxide, antimony oxide and of a salt of a metal selected from the group consisting of Zn, Na, K, Ca, Ba and Mg and of a weak acid selected from the group consisting of an aliphatic carbon acid having 1 to 2 carbon atoms, an oxygen acid from an element in Group 3a, 4a or 5a of the Periodic System of Elements and $H_2S$, the oxide and the salt being present in the mixture in a weight ratio of from 10:1 to 1:1; and (c) from 0 to 50% by weight of a fiber reinforcing agent.

2. A composition as claimed in Claim 1, containing as flame retardant a halogenated polycarbonate, a halogenated polymethacrylic acid ester, a halogenated polyether, a halogenated polyester, a halogenated polyamide, a condensate of chloranil and ammonia, a halogenated polyphenyl, a halogenated polysulfide or a halogenated polysulfone.

3. A composition as claimed in Claim 1 containing as additional flame retardant a mixture of zinc oxide and iron oxide.

4. A composition as claimed in Claim 1 containing a mixture of ZnO and $CaCO_3$.

References Cited

UNITED STATES PATENTS

| | | | |
|---|---|---|---|
| 2,862,284 | 12/1958 | Wiszer | 28—82 |
| 2,919,258 | 12/1959 | Pietrusza | 260—37 |
| 2,205,722 | 6/1940 | Graves | 260—37 |
| 3,418,267 | 12/1968 | Busse | 260—33.8 |
| 3,630,988 | 12/1971 | Deyrup | 260—37 N |
| 2,978,340 | 4/1961 | Veatch | 260—37 NX |
| 3,304,282 | 2/1967 | Cadus | 260—37 |
| 3,422,048 | 1/1969 | Cannelongo | 260—28.5 |
| 3,418,263 | 12/1968 | Hindersinn | 260—23 |
| 3,583,938 | 6/1971 | Okada | 260—45.9 R |
| 3,748,303 | 7/1973 | Becker | 260—47 XA |
| 3,688,001 | 8/1972 | Exner | 260—463 |
| 3,655,589 | 4/1972 | Wingler | 260—2.5 FP |

FOREIGN PATENTS

| | | |
|---|---|---|
| 294,325 | 9/1966 | Australia. |
| 1,425,972 | 12/1965 | France. |

OTHER REFERENCES

Flame-Retardant Additives in Plastics, W. G. Schmidt, Trans. J. Plastic Inst., December 1965, pp. 247–249.

ALLAN LIEBERMAN, Primary Examiner

R. ZAITLEN, Assistant Examiner

U.S. Cl. X.R.

106—15 FP